United States Patent [19]

Tatah et al.

[11] Patent Number: 5,786,560

[45] Date of Patent: Jul. 28, 1998

[54] 3-DIMENSIONAL MICROMACHINING WITH FEMTOSECOND LASER PULSES

[75] Inventors: Abdelkrim Tatah, Arlington; Akira Fukumoto, Winchester, both of Mass.

[73] Assignee: Panasonic Technologies, Inc., Cambridge, Mass.

[21] Appl. No.: 874,775

[22] Filed: Jun. 13, 1997

Related U.S. Application Data

[63] Continuation of Ser. No. 414,348, Mar. 31, 1995, abandoned.

[51] Int. Cl.⁶ .................................................. B23K 26/06
[52] U.S. Cl. ........................... 219/121.77; 219/121.85
[58] Field of Search .......................... 219/121.6, 121.61,
219/121.68, 121.69, 121.73, 121.75, 121.76,
121.77, 121.85; 264/1.77, 400, 482; 365/119,
127, 151; 347/224

[56] References Cited

U.S. PATENT DOCUMENTS

| | | | |
|---|---|---|---|
| 3,399,993 | 9/1968 | Agnew | 430/394 |
| 3,609,707 | 9/1971 | Lewis et al. | 365/119 |
| 3,715,734 | 2/1973 | Fajans | 365/127 |
| 4,041,476 | 8/1977 | Swainson | 365/119 |
| 4,092,518 | 5/1978 | Merard | 219/121.61 |
| 4,148,057 | 4/1979 | Jesse | 347/232 |
| 4,288,861 | 9/1981 | Swainson et al. | 365/127 |
| 4,866,660 | 9/1989 | Merkelo et al. | |
| 4,931,704 | 6/1990 | Alfano et al. | |
| 4,980,566 | 12/1990 | Heilweil | |
| 5,007,059 | 4/1991 | Keller et al. | |
| 5,034,613 | 7/1991 | Denk et al. | 250/458.1 |
| 5,054,027 | 10/1991 | Goodberlet et al. | |
| 5,095,487 | 3/1992 | Meyerhofer et al. | |
| 5,119,383 | 6/1992 | Duling, III et al. | |
| 5,132,824 | 7/1992 | Patel et al. | |
| 5,175,664 | 12/1992 | Diels et al. | |
| 5,206,496 | 4/1993 | Clement et al. | 219/121.6 |
| 5,265,107 | 11/1993 | Delfyett, Jr. | |
| 5,268,862 | 12/1993 | Rentzepis | 365/151 |
| 5,283,407 | 2/1994 | Strickler et al. | 365/127 |
| 5,323,260 | 6/1994 | Alfano et al. | |
| 5,365,366 | 11/1994 | Kafka et al. | |
| 5,371,368 | 12/1994 | Alfano et al. | |
| 5,377,043 | 12/1994 | Pelouch et al. | |
| 5,472,759 | 12/1995 | Chen et al. | 428/65.1 |

OTHER PUBLICATIONS

Hecht, J. "The Laser Guidebook", 2nd ed. New York. McGraw-Hill Inc., 1992, pp. 38, 39, 223.

*Primary Examiner*—Gregory L. Mills
*Attorney, Agent, or Firm*—Ratner & Prestia

[57] ABSTRACT

A method of treating a material by generating an ultraviolet wavelength laser beam having femtosecond pulses; splitting the ultraviolet wavelength laser beam into a plurality of separate laser beams having femtosecond pulses; directing the separate laser beams onto a target point within a sample such that the femtosecond pulses of the separate beams overlap to create an intensity sufficient to treat the sample. Apparatus for treating a material that includes an ultraviolet laser for generating an ultraviolet wavelength laser beam having femtosecond pulse and directing that ultraviolet wavelength laser beam onto a beam splitter; a beam splitter for splitting the ultraviolet wave length laser beam into a plurality of separate laser beams having femtosecond pulses; directing the separate laser beams onto a target point within a sample such that the femtosecond pulses of the separate beams overlap to create an intensity sufficient to treat the sample.

5 Claims, 3 Drawing Sheets

3-DIMENSIONAL MICROMACHINING WITH FEMTOSECOND LASER PULSES

This application is a continuation of application Ser. No. 08/414,348 filed Mar. 31, 1995, now abandoned.

FIELD OF THE INVENTION

This invention relates to laser micromachining and, more particularly, to the use of laser beams having femtosecond pulses to form 3-dimensional microfeatures beneath the surface of a sample.

BACKGROUND OF THE INVENTION

Laser beam technology is often used in material treatment applications. One such application is the formation of microfeatures on a material sample. Visibly transparent materials, such as glass, are susceptible to ablation, damage, or phase change when subjected to laser beams having an intensity above a certain threshold level. Focusing a laser beam having an intensity above this threshold level onto a sample of such a material can thus be used to form desired features on the sample. When the intensity of the laser beam is below the threshold level, the beam traverses the sample without affecting it.

Laser beams having femtosecond pulses are particularly adapted for forming microfeatures. Femtosecond pulses occupy a space on the order of one micrometer or less. Generally, a femtosecond pulse occupies a free-space distance of 0.3 microns. (By comparison, a picosecond pulse occupies a free-space distance of 300 microns.) This distance may be shorter inside a transparent media because of the higher index of refraction within the media.

In addition, the high peak fields of femtosecond pulses generate multiphoton absorption and ionization in various materials. In the ultraviolet spectrum range, the high peak fields of femtosecond pulses ablate and cause bond breaking in certain polymers and glass materials. The combination of high peak fields and high photon energy at ultraviolet wavelengths is an advantage in laser-machining transparent media such as glass.

Conventionally, laser beams have been used to micromachine features on the surface of a sample. In many applications, however, spot microfeatures within a sample—below the sample surface—are desirable. Conventional techniques are not suited to do this. Simply focusing onto such a spot a laser beam having an intensity high enough to damage the sample is ineffective. The focused beam causes damage at the surface of the sample as well as at the target location within the sample.

SUMMARY OF THE INVENTION

The present invention involves a method of treating a material by generating an ultraviolet wavelength laser beam having femtosecond pulses; splitting the ultraviolet wavelength laser beam into a plurality of separate laser beams having femtosecond pulses; and directing the separate laser beams onto a target point within a sample such that the femtosecond pulses of the separate beams overlap to create an intensity sufficient to treat the sample.

In another embodiment, the present invention involves apparatus for treating a material that includes a laser for generating an ultraviolet wavelength laser beam having femtosecond pulses; a beam splitter for splitting the ultraviolet wavelength laser beam into a plurality of separate laser beams having femtosecond pulses; and optics for directing the separate laser beams onto a target point within a sample such that the femtosecond pulses of the separate beams overlap to create an intensity sufficient to treat the sample.

DETAILED DESCRIPTION OF THE INVENTION

The present invention involves splitting a beam from a femtosecond ultraviolet laser into a number of beams using diffractive optics, and recombining those beams at a single spot to cause point damage in transparent media. Using this invention, it is possible to imbed spot microfeatures below the surface of a sample. This technique may be used, for example, to form high capacity 3-dimensional optical storage features and 3-dimensional filter gratings.

Short femtosecond pulses (occupying less than a micrometer of space) in the ultraviolet range may cause permanent damage or phase change in visibly transparent materials above a threshold intensity. Although the initial beam generated according to the present invention has pulses with an intensity above this threshold intensity, the intensity of the pulses of each of the separated beams is below this threshold intensity. As a result, each of the separated beams is capable of traversing the transparent sample media without affecting it. The pulses are recombined in the sample, however, such that the combined total intensity within the sample is above the threshold intensity. Accordingly, a microfeature may be locally written in the sample at the target point where the separated beams are recombined.

The spot microfeatures that may be formed using the present invention are commonly referred to as "bits." Bits may be considered to be information—points in a sample that may be stored and read.

The four separated beams used in the exemplary embodiment of the present invention define the three spatial coordinates and a time coordinate. Four beams intersect to define a point. If only two beams are used, their intersection defines a plane; if three beams are used, their intersection defines a line.

The total intensity of three or less of the four beams used in the exemplary embodiment of the present invention is less than the damage threshold intensity of the material. The total intensity of the four beams, however, exceeds this threshold intensity in order to cause damage or phase transition in the sample medium. Beam delays for each of the separate beams must be chosen to coordinate the meeting of the beam pulses such that the pulses overlap one another at the desired target point. The optical path length for each of the four separate beams should be the same. Using this invention, it is possible to form submicron features deep within transparent sample media.

Figure 1:
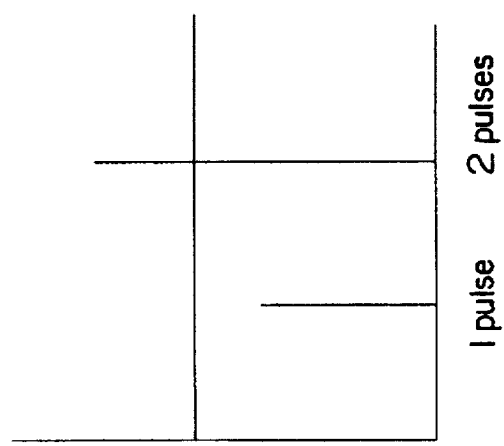
FIG. 1 is a graph illustrating the effect of combining laser beams in accordance with the present invention.

FIG. 1 illustrates the relationship between the threshold intensity for damage in a transparent medium and the intensity of the beam pulses. For ease of explanation, only two pulses (rather than four) are shown in FIG. 1. The illustrated principle applies equally to the combination of four beams, however.

As seen in FIG. 1, the intensity of one pulse falls below a threshold intensity of the sample. When two pulses are combined, however, the intensity of the combined pulses is well above the threshold intensity. The combined pulses are thus capable of damaging the sample medium, and accordingly forming microfeatures therein.

Figure 2:
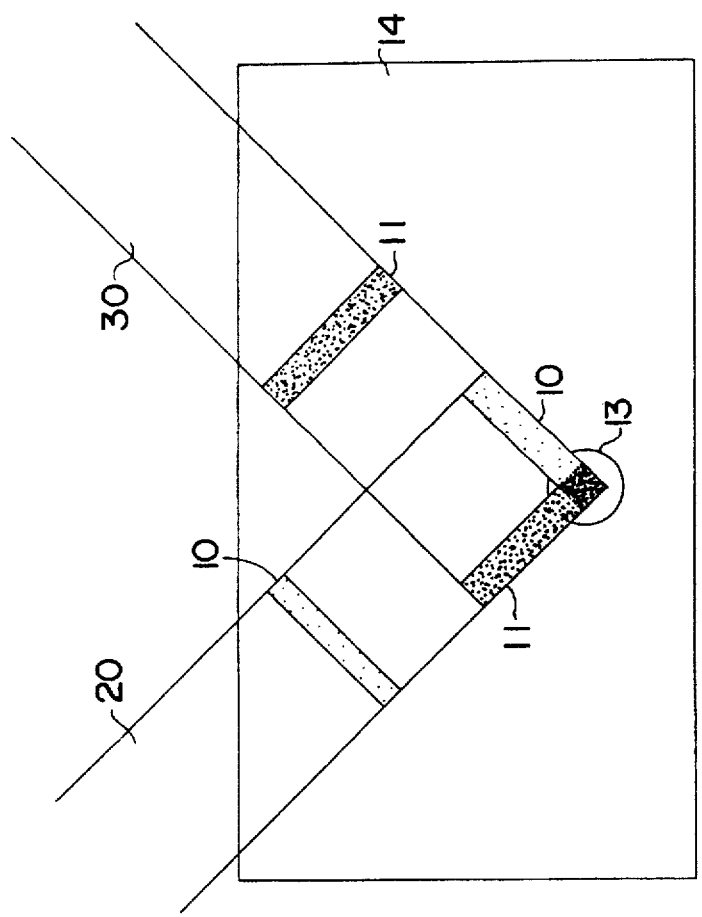
FIG. 2 is a side view of two beams overlapping within a sample according to an exemplary embodiment of the present invention.

FIG. 2 illustrates the overlap of the pulses for a simple 2-dimensional case. The pulses 10 of beam 20 overlap the pulses 11 of beam 30 within the region 13 inside sample 14. The region 13 is the target location for formation of the microfeature. At that location, because of the overlap of the pulses, the intensity is high enough to damage the sample medium and create a feature therein. While FIG. 2 illustrates a 2-dimensional case, 3-dimensional spot feature formation requires four beams in three dimensions with appropriate path delays.

Figure 3:
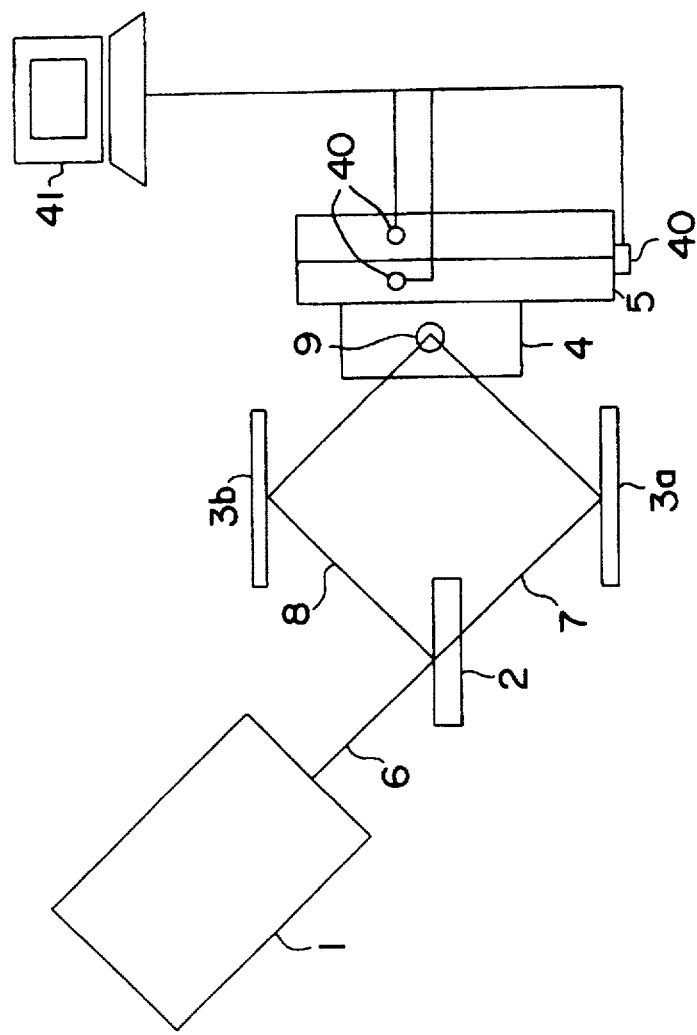
FIG. 3 is a side plan view of an exemplary sample treatment system according the present invention.

FIG. 3 illustrates a system for micromachining a 2-dimensional feature in sample 4. Again, for simplicity, only two beams are combined in this illustration. In FIG. 3, femtosecond laser 1 generates an ultraviolet laser beam 6 having femtosecond pulses with an intensity above the damage threshold intensity of sample 4. Femtosecond laser 1 may be any femtosecond laser known in the art. Suitable femtosecond lasers include the Sunami model Ti:sapphire laser available from Spectra-Physics, Mountain View, Calif., and the Fant excimer femtosecond laser and amplifier system available from Lamda Physics in Germany. The former model is suitable for generating infrared or ultraviolet laser beams, the latter for ultraviolet laser beams.

Beam 6 is directed onto a dielectric optical beam splitter 2. Dielectric optical beam splitter 2 may be any such beam splitter known in the art.

Dielectric optical beam splitter 2 splits beam 6 into two separate beams 7, 8. Beams 7 and 8 are directed onto mirrors 3a and 3b, respectively, which direct beams 7 and 8 into transparent sample 4. Beams 7 and 8 intersect at target point 9. At target point 9, where beams 7 and 8 have overlapping pulses, a microfeature is formed. The optical path lengths of beams 7 and 8 in the exemplary embodiment of FIG. 3 are identical in order to insure that the pulses coincide inside sample 4.

Figure 4:
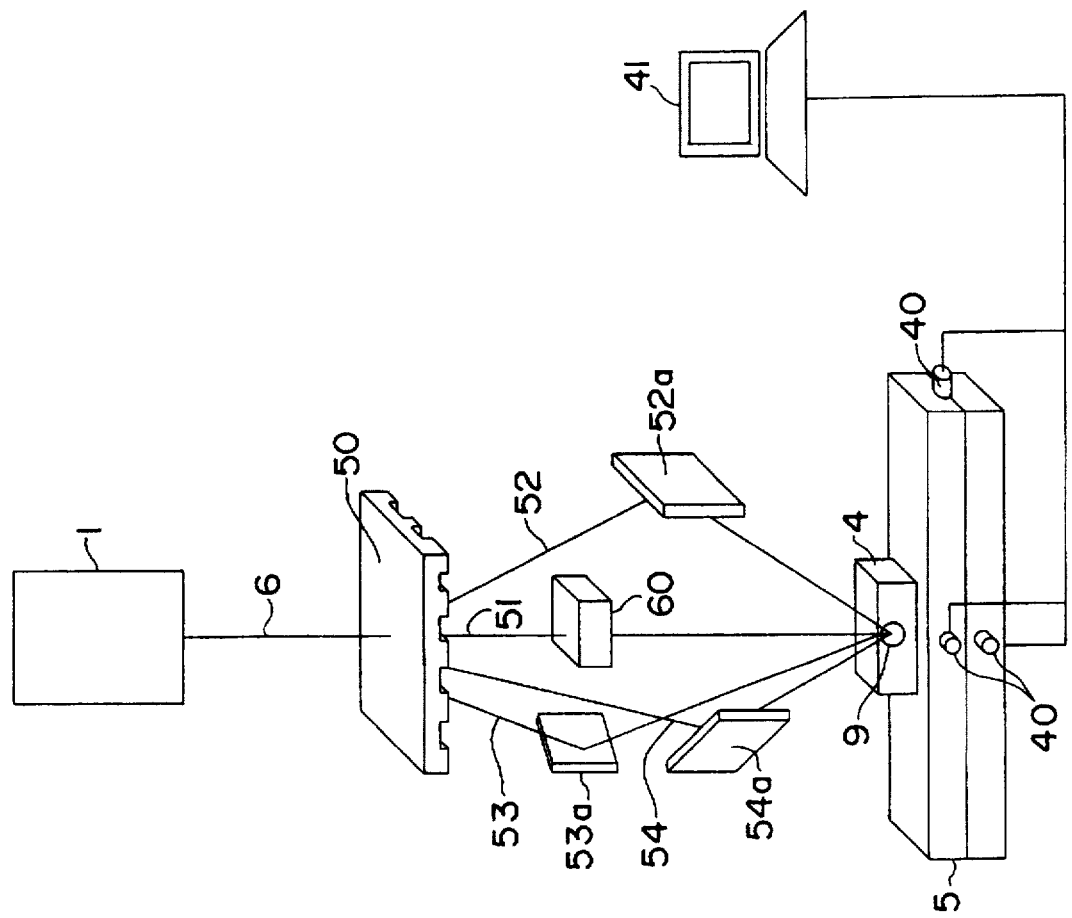
FIG. 4 is a perspective view of an exemplary sample treatment system according the present invention.

FIG. 4 is an alternative exemplary embodiment of the present invention showing the use of four beams that recombine to form a spot microfeature. In FIG. 4, laser 1 generates ultraviolet laser beam 6, as described in connection with FIG. 3, having femtosecond pulses with an intensity above the damage threshold intensity of sample 4.

Beam 6 in FIG. 4 is directed onto a diffractive optical element 50. In the illustrated embodiment, diffractive optical element 50 is a diffractive optical mask. In general, diffractive optical elements are created by etching micropatterns of specific depths in a substrate such as glass. In the illustrated embodiment, the lithography and etching process used in semiconductor fabrication, as outlined in U.S. Pat. No. 4,895,790, may be used to make the diffractive optical mask. The '790 patent is hereby incorporated by reference into the present application for its teaching of lithography and etching.

Diffractive optical element 50 splits beam 6 into four separate beams, beam 51, beam 52, beam 53, and beam 54, each of the four beams 51, 52, 53, and 54 having an approximately equal percentage of the energy of beam 6. (The energy of beam 6 should be sufficient to take into account any potential losses that may occur as beam 6 is split and as beams 51, 52, 53, and 54 travel to target point 9; the total available energy when the beams recombine should be sufficient to treat sample 4.) Beam 51 in the illustrated embodiment comes out of diffractive optical element 50 along the same axis as beam 6 went into diffractive optical element 50. Beams 52, 53, and 54 come out of diffractive optical element 50 diagonally to form a pyramid around beam 51. That is, beams 52, 53, and 54 come out of diffractive optical element 50 along the edges of an imaginary pyramid formed around beam 51. In this manner, beams 52, 53, and 54 are all equidistant from each other and from beam 51.

Mirrors 52a, 53a, and 54a are in the paths of beams 52, 53, and 54, respectively. Mirrors 52a, 53a, and 54a are disposed such that their reflective surfaces are perpendicular to a line (not shown) extending perpendicularly outward from beam 51.

Mirrors 52a, 53a, and 54a reflect beams 52, 53, and 54, respectively, back in toward beam 51. Mirrors 52a, 53a, and 54a are positioned so that beams 52, 53, and 54, intersect each other and beam 51 at target point 9 within sample 4.

The optical beam paths of beams 51, 52, 53, and 54 should all be the same to ensure that the pulses of the beams properly coincide at target point 9. Because beam 51 travels a shorter distance to target point 9 than beams 52, 53, and 54 (which all travel equal distances in the illustrated embodiment), it is necessary to use a beam delay on beam 51.

The beam delay in the illustrated embodiment is accomplished by disposing a piece of glass 60 in the path of beam 51. The thickness of glass 60 will determine the amount of delay in beam 51. The necessary thickness of glass 60 may be easily determined by first calculating the difference in the time it takes one of beams 52, 53, or 54 to travel from diffractive optical element 50 to target point 9 along the illustrated paths, and the time it takes beam 51, without a delay, to travel that distance. Given that time difference (which is the time to be added to the optical path of beam 51) and knowing the speed of light in glass (c/n, where c=speed of light in a vacuum and n=index of refraction of the glass), it is possible to calculate the necessary thickness of the glass to provide the desired delay.

Using the beam delay, the optical paths of beams 51, 52, 53, and 54 may all be equated. This ensures proper coincision of the pulses in the beams when they intersect at target point 9 to form a spot microfeature.

After a microfeature is formed, XYZ stage 5 supporting sample 4 may be moved to a new position to write another microfeature, if so desired. XYZ stage 5 is equipped with motion controls 40 that are controlled by computer 41. Suitable motion systems are available from Dover Instrument Corp., Westboro, Mass., which may be interfaced to a 486 IBM PC or compatible. Alternatively, the entire head of, for example, a compact disc that is being imprinted with bits may be moved under the laser beams using conventional motion techniques for compact disc heads.

When forming multiple microfeatures within a sample, it is important to start at the base of the sample and proceed to the top toward the laser so that previously written records do not interfere with the beams for writing subsequent records.

This invention uses the short-fill and micromachining ability of femtosecond pulses to imbed spot microfeatures in transparent media. In principle, this technique can be extended to CW or long-pulsed laser beams which are made to intersect or overlap in a medium and cause local damage. The limited working distance of lenses used for writing microfeatures with such CW or long pulsed laser beams makes it difficult to write microfeatures deep inside transparent media using such laser beams, however. Thus, microfeature formation using such laser beams is most effective when used close to the surface of the sample. Using overlapping femtosecond pulses according to the present invention allows micromachining to a much greater extent within the media. The invention provides true 3-dimensional micromachining.

The technique of the present invention is well-suited for 3-dimensional optical storage applications. The optical storage industry currently uses parallel transparent stacked disks having separately recorded microfeatures. Such disks must subsequently be stacked to form a 3-dimensional medium. Using the present invention, however, optically stored digital data may be written, and possibly even read, in a true 3-dimensional medium without the need for stacking disks.

The present invention also finds application in 3-dimensional grating for wavelength filtering of light. Such filtering requires a 3-dimensional array of features spaced at distances which are less than the wavelength of the chosen light color or which approximate that wavelength. This enables the light to be filtered to make it evanescent and prevent it from propagating. Such a filter may be formed using the technique of the present invention. A sample having micromachine features as described above may be config.d to act as a filter for a broad light source because it can be machined to block only the designated wavelength and transmit the rest of the spectrum.

While the present invention has been described in terms of exemplary embodiments, it is contemplated that it may be practiced as outlined above with modifications that are within the spirit and scope of the appended claims.

What is claimed:

1. A method of treating a material comprising the steps of:
   (a) generating at least four beams having femtosecond pulses, said beams individually having an intensity below a damage threshold intensity of said material;
   (b) directing said beams onto a target point within said material such that said femtosecond pulses of said beams overlap to create a total intensity at said target point that is at or above said damage threshold intensity and;
   (c) delaying at least one of said beams such that said femtosecond pulses of said beams coincide at said target point.

2. A method of treating a material comprising the steps of:
   (a) generating a beam having femtosecond pulses;
   (b) splitting said beam into at least four separate beams having femtosecond pulses;
   (c) directing said separate beams onto a target point within said material such that said femtosecond pulses of said separate beams coincide to create an intensity sufficient to treat said material and;
   (d) delaying at least one of said beams such that said femtosecond pulses of said beams coincide at said target point.

3. A method as claimed in claim 2 wherein said laser beam is an ultraviolet wavelength laser beam.

4. A method of micromachining a feature in a sample of transparent material below the surface of said sample comprising the steps of:
   (a) generating an ultraviolet wavelength laser beam having femtosecond pulses;
   (b) splitting said laser beam into four separate laser beams having femtosecond pulses;
   (c) directing said four separate laser beams onto a target point within said sample such that said femtosecond pulses of said four separate beams overlap to create an intensity sufficient to form said feature in said sample; and
   (c) delaying at least one of said four separate laser beams such that said femtosecond pulses of said beams overlap at said target point.

5. Apparatus for treating a material comprising:
   (a) means for generating a beam having femtosecond pulses;
   (b) means for splitting said beam into at least four separate beams having femtosecond pulses;
   (c) means for directing said separate beams onto a target point within a sample such that said femtosecond pulses of said separate beams overlap to create and intensity sufficient to treat said sample and;
   (d) means for delaying at least one of said beams such that said femtosecond pulses of said beams coincide at said target point.

* * * * *